April 29, 1952     I. G. ROTH     2,595,168
FISHING LURE
Filed Aug. 20, 1946
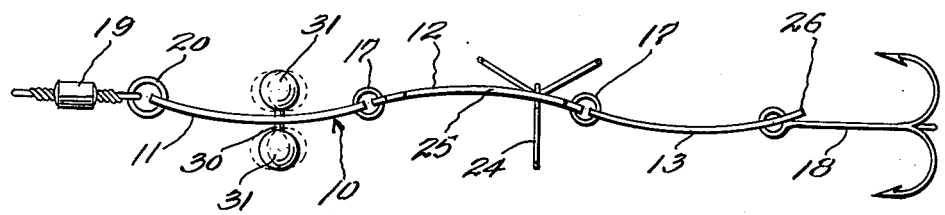
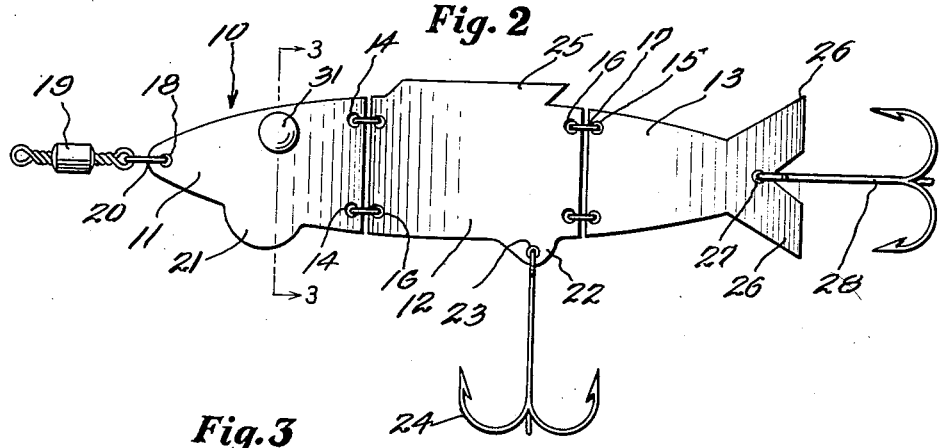
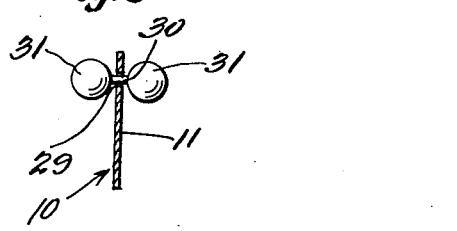
Inventor
*Irven G. Roth*
By *Wilfred E. Lawson*
Attorney Patented Apr. 29, 1952

2,595,168

UNITED STATES PATENT OFFICE 2,595,168

FISHING LURE

Irven George Roth, Lorain, Ohio

Application August 20, 1946, Serial No. 691,754

1 Claim. (Cl. 43—42.15)

This invention relates generally to the class of fishing and trapping and pertains particularly to improvements in fishing lures.

A principle object of the present invention is to provide an artificial bait or lure which is designed to simulate the form and natural movements of a live minnow, when drawn through the water at the end of a fishing line.

Another object of the invention is to provide an artificial bait of the character stated, which is made up of sections of metal of longitudinally curved form which, when joined together, have the appearance, in side elevation, of a small fish and when drawn through the water, are caused to have a waving or sinuous movement characteristic of the swimming movements of a fish.

Another object of the invention is to provide a fishing lure of the form and character stated wherein eye members are provided which are mounted in a novel manner to have movement suggestive of the movements of a fish's eye.

The invention will be best understood from a consideration of the following detailed description taken in connection with the accompanying drawing forming a part of the specification with the understanding, however, that the invention is not confined to a strict comformity with the showing of the drawing but may be changed or modified so long as such changes or modifications mark no material departure from the salient features of the invention as expressed in the appended claims.

In the drawing:

Figure 1 is a view in top plan of an artificial bait or lure constructed in accordance with the present invention.

Figure 2 is a view in side elevation of the same.

Figure 3 is a section taken on the line 3—3 of Figure 2.

Referring now more particularly to the drawing it will be seen that the lure or artificial bait is made up of several sections which are here shown as being three in number although it will be readily apparent that more sections may be employed if desired. The three sections of the lure body, which is generally designated 10, comprise a head piece or section 11, a central body section 12 and a tail piece or section 13.

As will be readily apparent upon reference to Figure 1 the three sections of the device are formed of sheet metal and each section is longitudinally curved.

The rear edge of the head section 11 and the forward edge of the tail section 13 have formed therethrough the apertures 14 and 15 respectively and these apertures cooperate with corresponding apertures 16 formed through the middle section 12 adjacent to the front and rear edges thereof, as shown, to receive the connecting or coupling rings 17. These rings form hinge like connections between the sections and as shown in Figure 1 the sections are assembled so that the curvature of the front and rear sections is in the same direction and that of the intermediate or middle section 12 is in the opposite direction thereby giving to the lure as a whole, when viewed in top plan as shown in Figure 1, a substantially ogee curvature.

The head section is tapered toward the forward or nose end as shown in Figure 2 and has an aperture 18 for the connection therewith of a swivel 19, through the medium of a coupling ring 20.

The bottom edge of the head section is provided with the downwardly extending fin simulating portion 21 and a corresponding downwardly extending fin simulating portion 22 extends from the bottom edge of the middle portion 12 adjacent to the rear thereof and this is provided with a suitable aperture 23 in which may be connected the shank of a hook 24.

The top edge of the middle section 12 has a central extension 25 simulating the dorsal fin of a fish while the rear end of the tail portion 13 is shaped to provide the two divergent portions 26 which simulate the tail or caudal fin.

Between the two portions 26 of the caudal fin an aperture 27 is formed in which is engaged the end of a hook 28.

Adjacent to the top edge of the head portion 11 and substantially midway between the ends thereof, an aperture 29 is formed through which extends the short pin 30 which carries upon its two ends the small balls 31 which represent the eyes of the fish lure.

The aperture 29 through which the eye supporting pin 30 passes is of sufficient diameter to permit the pin to have rocking movement so that when the lure is in operation the eye balls 31 will move in simulation of the eyes of a fish.

From the foregoing it will be readily apparent that when the lure is drawn through the water by a line attached to the swivel connection 19 the pressure of the water upon the curved sides of the sections making up the body, will give to the body a sinuous, weaving movement characteristic of the swimming movements of a fish and this movement together with the movements which the balls 31 will have, causes the lure to have all of the appearance and actions of a live fish to thereby excite and cause game fish to attack it.

I claim:

An artificial fishing lure comprising a relatively long body made up of a plurality of elongate plates, each of said plates having a uniform longitudinally arcuate curvature, the plates being arranged in edge opposed relation, hinge coupling means between adjacent edges of the plates whereby the plates have relative hinge movement on axes extending transversely of the body length, the plate members being coupled together with the curvatures in alternating relation whereby the body is given a substantially ogee curvature, the plates at the front and rear ends of the body having the shape of the head and tail portions respectively of a fish, the head plate and another plate each having a projecting bottom edge portion simulating a fin, means for attaching a line to the head portion, a hook attached to the fin of said other plate, and a hook attached to said tail portion.

IRVEN GEORGE ROTH.

REFERENCES CITED

The following references are of record in the file of this patent:

UNITED STATES PATENTS

| Number | Name | Date |
|---|---|---|
| 1,019,926 | Staples | Mar. 12, 1912 |
| 1,630,615 | Higgins | May 31, 1927 |
| 1,991,142 | Eggleston | Feb. 12, 1935 |
| 2,037,310 | Bryan | Apr. 14, 1936 |
| 2,043,001 | Lambrecht | June 2, 1936 |
| 2,214,266 | Haury | Sept. 10, 1940 |

FOREIGN PATENTS

| Number | Country | Date |
|---|---|---|
| 525,864 | Germany | May 29, 1931 |
| 59,398 | Austria | May 26, 1913 |
| 48,633 | Sweden | Mar. 3, 1919 |